US006796898B1

(12) United States Patent
Timpano

(10) Patent No.: US 6,796,898 B1
(45) Date of Patent: Sep. 28, 2004

(54) METHOD FOR PROVIDING A BLACKJACK INSURANCE WAGER

(76) Inventor: Mike Timpano, 364 Grenville Ave., Orillia, Ontario (CA), L3V 7P7

( * ) Notice: Subject to any disclaimer, the term of this patent is extended or adjusted under 35 U.S.C. 154(b) by 86 days.

(21) Appl. No.: 09/784,947

(22) Filed: Feb. 15, 2001

(51) Int. Cl.[7] .................................................. A63F 13/00

(52) U.S. Cl. ........................... 463/12; 463/25; 273/274; 273/292

(58) Field of Search ................................ 463/9–12, 25; 273/274, 292

(56) References Cited

U.S. PATENT DOCUMENTS

| | | | | | |
|---|---|---|---|---|---|
| 5,178,390 | A | * | 1/1993 | Okada | 273/143 R |
| 5,791,989 | A | * | 8/1998 | Slinkman | 463/12 |
| 6,113,493 | A | * | 9/2000 | Walker et al. | 463/20 |
| 6,293,551 | B1 | * | 9/2001 | Webb | 273/292 |

OTHER PUBLICATIONS

Insurance Plus, More Insurance Opportunities . . . With Greater Pay–Outs, B. Michael Timpano, Copyright Jan. 1998, pp 1–2.*

* cited by examiner

*Primary Examiner*—Jessica Harrison
*Assistant Examiner*—Aaron Capron
(74) *Attorney, Agent, or Firm*—Robert Ryan Morishita; Anderson & Morishita, LLC

(57) ABSTRACT

An improved insurance wager for Blackjack includes defining an insurance outcome set containing two or more predetermined holdings and an insurance payout associated with each holding. Each player makes an initial wager and the Blackjack game is dealt in a fashion known in the art. The insurance wager is available if the dealer's face-up card has a predetermined value, optionally ten. After each player completes his hand or busts, the dealer forms a final hand by hitting or standing according to the conventional rules of Blackjack. If the dealer's final hand is within the insurance outcome set, remaining players are rewarded based on the player's insurance wager without regard to the player's final hand. Otherwise, the player loses the insurance wager.

8 Claims, 2 Drawing Sheets

METHOD FOR PROVIDING A BLACKJACK INSURANCE WAGER

FIELD OF THE INVENTION

The present invention relates to gaming and gambling games. Specifically, the present invention is an improved insurance wager for a card game played between a dealer and a player according to the conventional rules of Blackjack.

BACKGROUND OF THE INVENTION

Many casino games include players playing against the casino to obtain a player hand having a value closer to a target value than the house hand. Blackjack, for example, is a well known card game played in casinos. The object of the game is to have a final hand total closer to twenty-one than the dealer's final hand total without exceeding twenty-one. For purposes of calculating the final hand total, each card has a value equal to its face value except face cards, which have a value of ten, and aces, which may have a value of eleven or one as the player selects. In conventional Blackjack, the suit of the cards is irrelevant.

The form of Blackjack played in casinos is played between a dealer, representing the house, and at least one player. In a typical Blackjack game, each player makes a base wager in a wagering area on a playing surface. The dealer deals two cards to each player and two cards, one card face up and the other face down, to himself or herself. If the dealer has an Ace exposed in his hand, each player may make an insurance wager equal to one half the player's base wager. The dealer checks his hole card and, if he has a natural twenty-one, rewards any player making an insurance wager but collects the player's base wager. Because the insurance wager is paid at two to one, but is only one half the player's base wager, winning the insurance wager results in a wash, that is, the player can only break even. If the dealer does not have a natural twenty-one, insurance wagers are immediately collected.

If the dealer does not have a natural twenty one, any player receiving a natural twenty-one or Blackjack, i.e. a total of twenty-one in the initial dealt hand, is immediately rewarded, typically at a rate of 2:1 or 3:2, and play is terminated as to that player. Each remaining player examines the player's hand and decides whether to hit, i.e. receive another card, or stand, i.e. stand on the player's current hand. A player may hit as many times as the player wishes as long as the player does not bust, i.e. receive a card causing his cumulative total to exceed twenty-one. When a player busts, the player's wager is immediately collected and play is terminated as to that player.

A player may also have additional options available depending on the initial player hand dealt. If the player receives a pair, i.e. two cards having the same face value, the player may split the pair and use each card as a basis for a separate hand. For example, if a player were to be dealt a pair of eights, the player may choose to split the pair and continue play with two hands each having an eight and an additional dealt card. Each of those individual hands is then played independently.

A player may also have the option to double down. Although the availability of the double down option vary from casino to casino, the option allows a player to double the player's wager in exchange for a single additional card.

After all the players have played their hands, the dealer reveals the face-down card in the dealer's hand. The dealer plays the dealer's hand according to established house rules. That is, the casino uses established rules to eliminate the dealer's discretion hits or stands as the house rules dictate, and resolves the wagers. In resolving the wagers, players with a final hand total closer to twenty-one than the dealer's final hand total are rewarded at 1:1. Conversely, wagers are collected from players with a final hand total further from twenty-one than the dealer's final hand total. If the dealer busts, all players who did not bust or receive a Blackjack are rewarded. If the player and dealer push, i.e. have the same final hand total, the player's wager is returned.

The drawback to this game is that the insurance wager is only available for initial holdings and not for the final dealer hand. Also, insurance wagers are often seen as unattractive wagers to experienced players because of the infrequency of the payout and the fact that winning the insurance wager only means that the player breaks even. Further, it is known in the art that players are drawn to new features on conventional games, especially when those features lead to higher or more frequent payouts. Thus, it can be seen that there is a need in the art for a method for playing Blackjack that allows larger payouts and an attractive opportunity to insure a wager after the initial holding.

SUMMARY OF THE INVENTION

The present invention is a an improved insurance wager for Blackjack. The insurance wager of the present invention is available when the dealer's face-up card is a card having a predetermined value, optionally ten. Thus, in the optional embodiment, the insurance wager is available when the dealer's face-up card is a ten or a face card.

An insurance outcome set is defined. The insurance outcome set contains at least two predetermined holdings with an insurance payout associated with each holding. Optionally, the insurance payout for each holding is different. In an optional embodiment, the outcome set includes natural twenty-one, twenty-one, and twenty.

As known in the art, Blackjack is played between a player and a dealer. The player makes an initial wager and the dealer deals an initial two-card hand to the player and the dealer. In the dealer's initial hand, one of the cards is dealt face-up. The player completes his or her hand by hitting or standing. Optionally, if the player busts, the player's cards are collected and the player is excluded from further play.

The dealer exposes his initial hand and forms a final hand by hitting or standing according to the conventional rules of Blackjack. If the dealer's final hand is within the insurance outcome set, the player receives the insurance payout associated with the predetermined holding, otherwise, the player loses the player's insurance wager. In an optional embodiment, the player is paid on an insurance wager without regard to the player's final hand, i.e. regardless of whether the player beats the dealer on the initial wager.

It is an object of the present invention to provide an insurance wager that insures against a dealer hand after the dealer's initial holding.

DESCRIPTION

Figure 1:
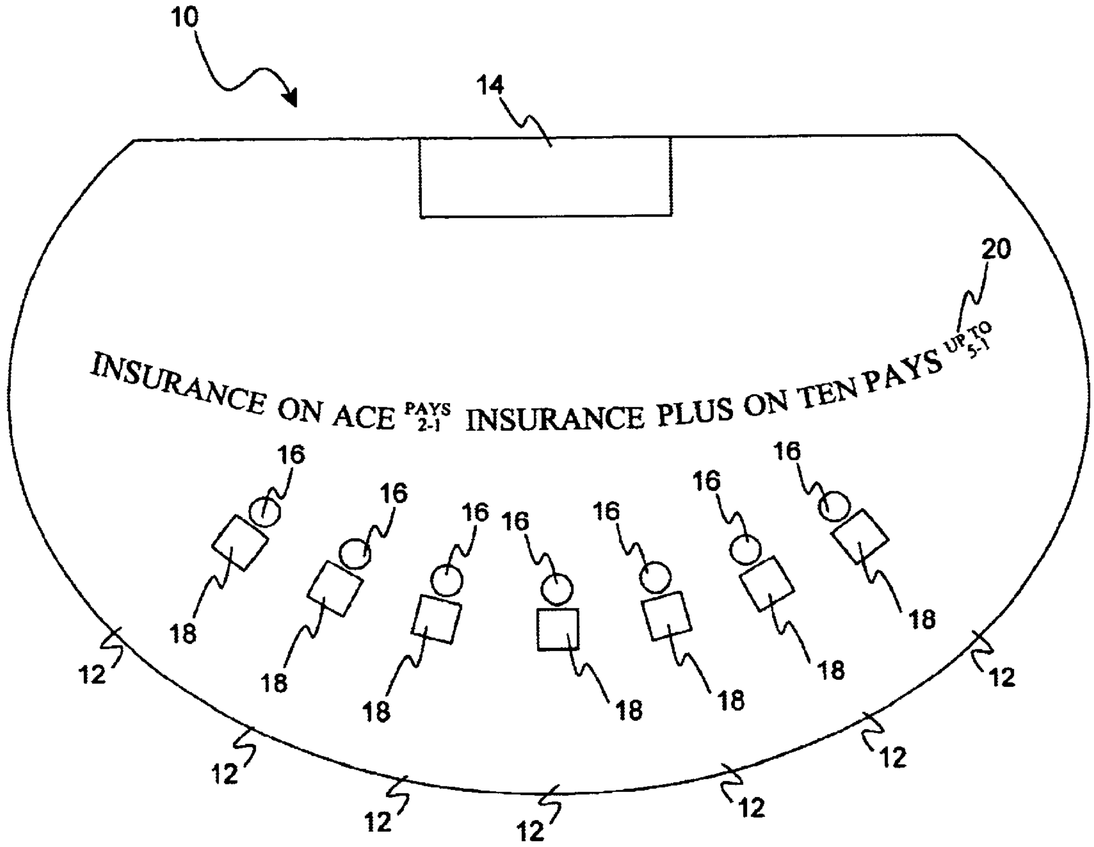
FIG. 1 is a top view of a gaming table layout according to an embodiment of the present invention.

Reference is now made to the figures wherein like parts are referred to by like numerals throughout. With reference to FIG. 1, the game of the present invention is played on a gaming table 10 with indicia on the playing surface to indicate player areas 12 and a dealer areas 14. The player areas 12 include wager areas 16 and action areas 18 where cards may be dealt. The surface also includes an insurance area 20 where insurance wagers 28 may be placed. The gaming table 10 optionally includes a sign (not shown) or other visible indication of the insurance outcome set 30 and associated payouts as described below.

In the improved insurance wager 30 of the present invention, an insurance outcome set 30 is defined. The insurance outcome set 30 contains at least two predetermined holdings for which an insurance wager 28 will be paid and a payout associated with each holding. In an optional embodiment, the payout for each holding is different. While any outcome could be included in the insurance outcome set 30, in an optional embodiment, outcomes that are typically winning outcomes for the dealer are included. That is, outcomes such as a natural twenty-one, i.e. Blackjack, twenty-one, and twenty are included in an optional embodiment because these outcomes virtually guarantee that the dealer will win the hand. An example insurance outcome set and associated payouts are shown in Table 1 below.

TABLE 1

| Dealer's Final Holding | Payout |
|---|---|
| 20 | Push |
| Blackjack | 4:1 |
| 21 | 5:1 |

Figure 2:
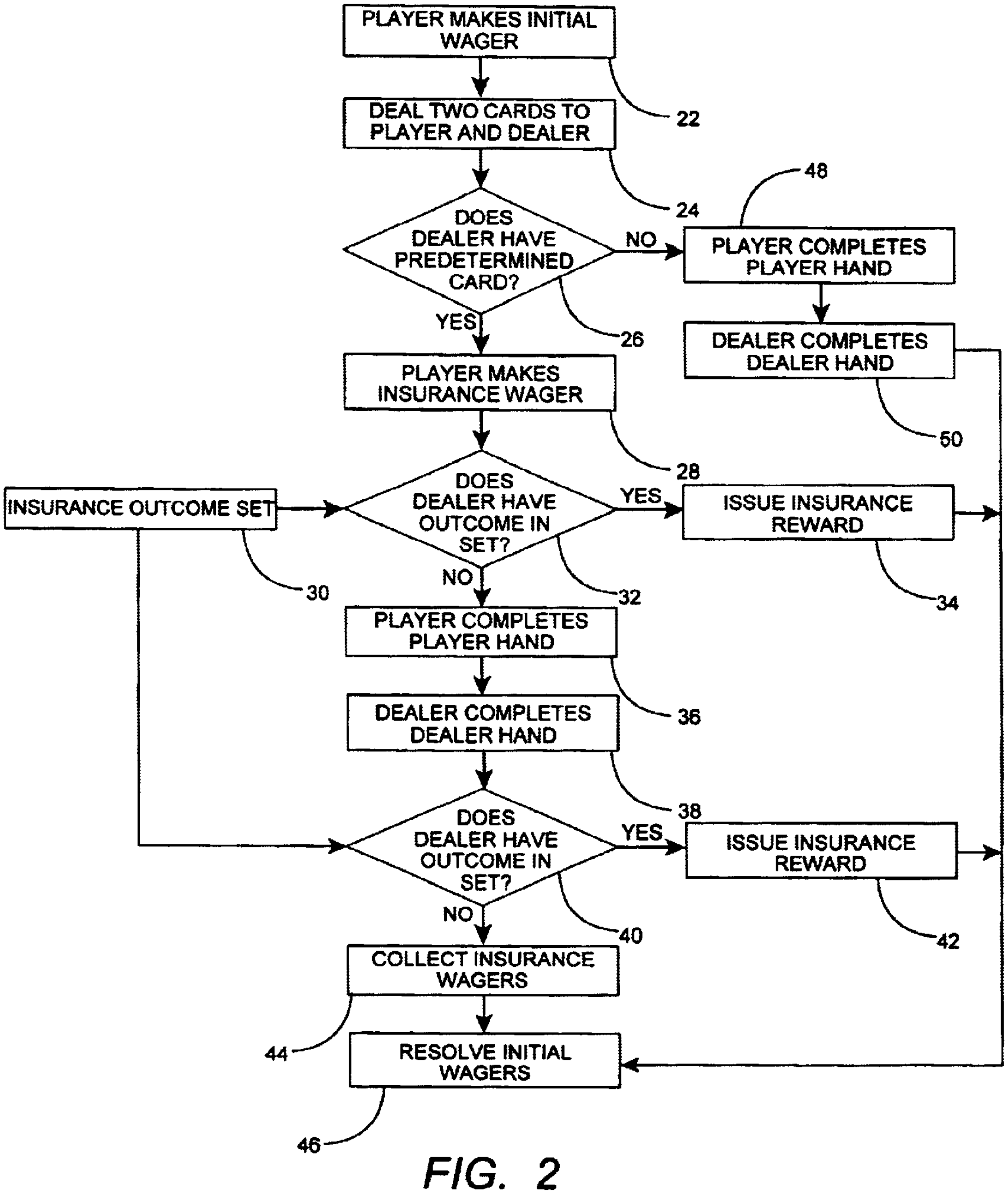
FIG. 2 is a flowchart of an embodiment of the method according to the present invention.

With reference to FIG. 2, the method of the present invention is an improved insurance wager 28 for conventional Blackjack. Conventional Blackjack is played between at least one player and a dealer using at least one deck of standard playing cards. As known in the art, Blackjack begins with players making an initial wager 22 by placing one or more gaming checks on the gaming table 10 in a wager area 16. The dealer deals 24 a two card hand to each player and a two card hand to the dealer. The dealer's two card hand includes one card dealt face up and one card dealt face down.

The improved insurance wager of the present invention is available to players when the dealer hand includes 26 a predetermined exposed card. While the predetermined card could be any card or cards, in an optional embodiment, the improved insurance wager is available when the dealer hand includes 26 a face-up card having a value of ten. As is known in the art, tens and face cards have a value of ten.

If the dealer does not have the predetermined card, players proceed to form final player hands 48, the dealer forms a final dealer hand 50, and initial wagers are resolved 46 as in conventional Blackjack. Conversely, if the dealer has the predetermined card 26 thereby making the insurance wager 28 available as described above, players may place an insurance wager 28 by positioning an additional quantity of gaming checks on the insurance area 20 of the gaming table 10. While the limit could be varied by the game operator, in an optional embodiment, a player may place an insurance wager 28 of up to half the value of the player's initial wager 22.

After all insurance wagers have been placed, the dealer proceeds with the conventional Blackjack game. In the optional embodiment in which Blackjack is one of the two holdings in the insurance outcome set 30, the dealer first determines 32 whether the dealer's initial hand has a sum of twenty-one, i.e. whether the dealer has Blackjack. If the dealer does have Blackjack, the dealer collects initial wagers from all players not also having Blackjack, pushes on initial wagers from players having Blackjack, and pays 34 insurance wagers. Conversely, if the dealer does not have Blackjack, the dealer leaves all insurance wagers on the playing surface because the dealer may still obtain an final holding for which the dealer will reward insurance wagers, such as, for example, a non-Blackjack hand total of twenty-one. It is also important to note that Blackjack need not be among the outcomes in the insurance outcome set 30. In an embodiment in which Blackjack is not in the insurance outcome set 30, play proceeds as described below.

Each player forms a final player hand 36 by hitting or standing according to conventional Blackjack. As is known in conventional Blackjack, players may also split or double down as house rules permit. If the player busts, that is, receives a card that causes the player's hand total to exceed twenty-one, the dealer collects the player's cards and the player's initial wager. In an optional embodiment, the dealer also collects the player's insurance wager if any. In such an embodiment, the player is excluded from further play.

After players complete their hands, the dealer completes the dealer hand 38 according to conventional Blackjack rules and house rules by hitting or standing. The dealer resolves 46 initial wagers by comparing the dealer's final hand to each player hand. Players having a final hand closer to twenty-one than the dealer are rewarded on their base wagers. Players further from twenty-one than the dealer lose their initial wagers. As can be seen in FIG. 2, resolution 46 of the initial wagers may optionally precede resolution of the insurance wagers 28 or follow resolution of the insurance wagers 28.

Insurance wagers 28 are resolved by comparing 40 the dealer's final hand 38 to the insurance outcome set 30. If the dealer's final holding is within the insurance outcome set, players placing insurance wagers 28 are issued 42 the payout associated with the particular holding. The insurance wager reward is issued 42 without regard to each player's final holding. That is, insurance wagers may be issued 42 to a player without regard to whether the player is rewarded 46 on the player's initial wager 22. If the dealer's final holding 38 is not within the insurance outcome set 30, all insurance wagers are collected 44.

While certain embodiments of the present invention have been shown and described it is to be understood that the present invention is subject to many modifications and changes without departing from the spirit and scope of the claims presented herein.

I claim:

1. An improved insurance wager method for a card game played between a dealer and a player according to the conventional rules of Blackjack in which the player makes an initial wager, the dealer deals an initial two-card hand to each of the player and dealer, one of the cards of the dealer's hand dealt face-up, and the player forms a final player hand, the improved insurance wager method comprising the steps of:

defining an insurance outcome set containing at least two predetermined holdings, wherein said predetermined holdings include at least one holding that is not an ace plus a ten-value card and another predetermined holding includes three or more cards, with an insurance payout associated with each holding;

defining a set of predetermined values, the player becoming eligible to place an insurance wager only if the dealer's face-up card has one of said predetermined values;

after dealing an initial dealer hand, the player making an insurance wager if the dealer's face-up card in the dealer's initial hand has one of said predetermined values;

the dealer exposing his initial hand and forming a final hand by hitting or standing according to the conventional rules of Blackjack; and if the dealer's final hand is within the insurance outcome set, the player receiving the insurance payout associated with the predetermined holding, otherwise, the player losing the player's insurance wager.

2. The method of claim 1 wherein the insurance payout for each holding in the insurance outcome set is different.

3. The method of claim 1 wherein said insurance outcome set consists essentially of natural twenty-one, twenty-one, and twenty.

4. The method of claim 1 wherein the predetermined value of the dealer's face-up card is ten.

5. An improved insurance wager method for a card game played between a dealer and a player according to the conventional rules of Blackjack in which the player makes an initial wager, the dealer deals an initial two-card hand to each of the player and dealer, one of the cards of the dealer's hand being dealt face-up, and the player forms a final player hand, the improved insurance wager method comprising the steps of:

defining an insurance outcome set containing at least two predetermined holdings, wherein said predetermined holdings include at least one holding that is not an ace plus a ten-value card and another predetermined holding includes three or more cards, with a different insurance payout associated with each holding;

after dealing an initial dealer hand, the player becoming eligible to place an insurance wager only if the dealer's face-up card in the dealer's initial hand has a value of ten;

the player making an insurance wager if the dealer's face-up card in the dealer's initial hand has a value of ten;

the dealer exposing his initial hand and forming a final hand by hitting or standing according to the conventional rules of Blackjack; and if the dealer's final hand is within the insurance outcome set, the player receiving the insurance payout associated with the predetermined holding without regard to the final player hand, otherwise, the player losing the player's insurance wager.

6. The method of claim 5 wherein said insurance outcome set consists essentially of natural twenty-one, twenty-one, and twenty.

7. An improved method for playing Blackjack between a dealer and a player in which the player makes an initial wager and the player and dealer are each dealt an initial two-card hand, one of the cards of the dealer's hand dealt face-up, the improved method comprising:

defining an insurance outcome set containing at least two predetermined holdings, wherein said predetermined holdings include (a) a holding of an ace plus a ten-value card and (b) at least one holding that is not an ace plus a ten-value card and another predetermined holding includes three or more cards, with a different insurance payout associated with each holding;

the dealer receiving an initial hand, the player becoming eligible to place an insurance wager only if the dealer's face-up card in the dealer's initial hand has a value of ten;

the player making an insurance wager if the dealer's face-up card in the dealer's initial hand has a value of ten;

the player hitting or standing to form a final player hand;

resolving the player's initial wager according to the conventional rules of Blackjack; and if the final player hand total is less than or equal to twenty-one, (a) the dealer exposing his initial hand and forming a final hand by hitting or standing according to the conventional rules of Blackjack and (b) if the dealer's final hand is within the insurance outcome set, the player receiving the insurance payout associated with the predetermined holding without regard to the final player hand, otherwise, the player losing the player's insurance wager.

8. The method of claim 7 wherein said insurance outcome set consists essentially of natural twenty-one, twenty-one, and twenty.

* * * * *